United States Patent
Ganireddy et al.

(10) Patent No.: US 8,922,958 B2
(45) Date of Patent: Dec. 30, 2014

(54) METHOD AND SYSTEMS FOR DISCHARGING ENERGY FROM AN ELECTRICAL FAULT

(75) Inventors: Govardhan Ganireddy, Bangalore (IN); Thomas Frederick Papallo, Jr., Palm Beach, FL (US); Thangavelu Asokan, Bangalore (IN); Adnan Kutubuddin Bohori, Bangalore (IN); Deepak Rajaram Raorane, Vadodara (IN); Srinivas Naga Palvadi, Secunderabad (IN)

(73) Assignee: General Electric Company, Schenectady, NY (US)

(*) Notice: Subject to any disclaimer, the term of this patent is extended or adjusted under 35 U.S.C. 154(b) by 183 days.

(21) Appl. No.: 13/494,180

(22) Filed: Jun. 12, 2012

(65) Prior Publication Data
US 2013/0329325 A1 Dec. 12, 2013

(51) Int. Cl.
*H02H 3/00* (2006.01)
*H02H 7/00* (2006.01)
*H02H 3/08* (2006.01)
*H02H 9/02* (2006.01)

(52) U.S. Cl.
USPC ............... 361/7; 361/2; 361/90; 361/93.1

(58) Field of Classification Search
CPC ............... H02H 1/0015; H02H 1/0023
USPC .................................................. 361/7
See application file for complete search history.

(56) References Cited

U.S. PATENT DOCUMENTS

| | | | |
|---|---|---|---|
| 3,968,393 A | 7/1976 | Murano et al. | |
| 4,194,138 A | 3/1980 | Johansson et al. | |
| 5,172,297 A | 12/1992 | Imakoma et al. | |
| 5,933,308 A * | 8/1999 | Garzon | 361/62 |
| 6,141,192 A * | 10/2000 | Garzon | 361/5 |
| 7,929,260 B2 * | 4/2011 | Roscoe et al. | 361/2 |
| 8,563,888 B2 * | 10/2013 | Bohori et al. | 218/157 |
| 8,618,435 B2 * | 12/2013 | Bohori et al. | 219/121.48 |
| 8,649,139 B2 * | 2/2014 | Roscoe et al. | 361/79 |
| 2009/0134129 A1 | 5/2009 | Robarge et al. | |
| 2009/0308845 A1 | 12/2009 | Bohori et al. | |

FOREIGN PATENT DOCUMENTS

| | | |
|---|---|---|
| EP | 1976077 A2 | 10/2008 |
| EP | 2432088 A2 | 3/2012 |
| JP | 5159653 A | 6/1993 |
| JP | 6310251 A | 11/1994 |

OTHER PUBLICATIONS

Search Report and Written Opinion from EP Application No. 13171738.1 dated Sep. 30, 2013.

* cited by examiner

*Primary Examiner* — Dharti Patel
(74) *Attorney, Agent, or Firm* — General Electric Company

(57) ABSTRACT

An electrical fault mitigation system includes a mitigation device including a containment chamber defining a cavity, a first electrode positioned within the cavity and coupled to a first conductor, and a second electrode positioned within the cavity and coupled to a second conductor. The mitigation device also includes a first voltage source, and a plasma gun positioned within the cavity and configured to emit ablative plasma using the first voltage source to discharge energy from an electrical fault. The system also includes a first voltage limiter device configured to limit a voltage of the first conductor from increasing above a predetermined threshold to prevent a second voltage source from generating a second electrical arc between the first electrode and the second electrode when the second voltage source applies a voltage across the first electrode and the second electrode.

20 Claims, 5 Drawing Sheets

METHOD AND SYSTEMS FOR DISCHARGING ENERGY FROM AN ELECTRICAL FAULT

BACKGROUND OF THE INVENTION

The present application relates generally to power systems and, more particularly, to a method and systems for use in discharging energy from an electrical fault.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables arc formation.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. In addition, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker generally does not trip or exhibits a delayed trip unless the circuit breaker is specifically designed to handle an arc fault condition.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by blowing a fuse or tripping a circuit breaker. However, the intentional short circuit fault created using a crowbar may allow significant levels of current to flow through adjacent electrical equipment, thereby enabling damage to the equipment.

BRIEF DESCRIPTION OF THE INVENTION

In one aspect, an electrical fault mitigation system is provided that includes a mitigation device including a containment chamber defining a cavity, a first electrode positioned within the cavity and coupled to a first conductor, and a second electrode positioned within the cavity and coupled to a second conductor. The mitigation device also includes a first voltage source, and a plasma gun positioned within the cavity and configured to emit ablative plasma using the first voltage source to enable a first electrical arc to form between the first electrode and the second electrode to discharge energy from an electrical fault. The system also includes a first voltage limiter device coupled to the first conductor. The first voltage limiter device is configured to limit a voltage of the first conductor from increasing above a predetermined threshold to prevent a second voltage source from generating a second electrical arc between the first electrode and the second electrode when the second voltage source applies a voltage across the first electrode and the second electrode.

In another aspect, an equipment protection system is provided that includes a first conductor, a second conductor, and a mitigation device. The mitigation device includes a containment chamber defining a cavity, a first electrode positioned within the cavity and coupled to the first conductor, and a second electrode positioned within the cavity and coupled to the second conductor. The mitigation device also includes a first voltage source, and a plasma gun positioned within the cavity. The system also includes a controller communicatively coupled to the mitigation device. The controller is configured to detect an electrical fault and to generate an activation signal in response to the detected electrical fault. The activation signal causes the first voltage source to apply a voltage to the plasma gun, wherein the plasma gun emits ablative plasma in response to the applied voltage to enable an electrical arc to form between the first electrode and the second electrode to discharge energy from the electrical fault. The system also includes a first voltage limiter device coupled to the first conductor. The first voltage limiter device is configured to limit a voltage of the first conductor from increasing above a predetermined threshold to prevent a second voltage source from generating a second electrical arc between the first electrode and the second electrode.

In yet another aspect, a method of discharging energy from an electrical fault within a power distribution system including a first conductor and a second conductor is provided. The method includes detecting an electrical fault within the power distribution system, and generating an activation signal in response to the detected electrical fault. The method also includes activating a mitigation device using the activation signal to discharge energy from the electrical fault. The mitigation device includes a first electrode coupled to the first conductor, a second electrode coupled to the second conductor, a first voltage source that generates a voltage in response to the activation signal, and a plasma gun that emits ablative plasma in response to the generated voltage to create an electrical arc between the first electrode and the second electrode to discharge the energy from the electrical fault. The method also includes limiting a voltage of at least one of the first conductor and the second conductor from increasing above a predetermined threshold using at least one voltage limiter device to prevent a second voltage source from generating a second electrical arc between the first electrode and the second electrode.

DETAILED DESCRIPTION OF THE INVENTION

Exemplary embodiments of a method and systems for use in discharging energy from an electrical fault are described herein. In an exemplary embodiment, an equipment protection system includes a controller, a current sensor, an optical sensor, and an arc mitigation system. The arc mitigation system includes a mitigation device and a voltage limiter device coupled to each conductor within the equipment protection system. If an electrical fault occurs, such as an arc flash event, the controller detects the fault using the current sensor and/or the optical sensor, for example. The controller transmits an activation signal to the mitigation device, and the mitigation device discharges energy from the electrical fault. More specifically, the mitigation device includes a plurality of electrodes and a plasma gun that emits ablative plasma into a gap defined between pairs of adjacent electrodes. The ablative plasma causes a low impedance path to be formed between the electrodes. The low impedance path has a lower impedance than an impedance associated with the electrical fault. Accordingly, current flows from the electrical fault to the electrodes of the mitigation device.

The voltage limiter devices enable the gaps between the electrodes to be reduced without undesired arcs forming during normal operation. For example, the voltage limiter devices limit the voltage of the conductors such that the voltage does not increase above an amount that would cause arcs to form between the electrodes during normal operation (i.e., when ablative plasma is not emitted into the gaps to reduce the impedance associated with the gaps). Accordingly, the voltage limiter devices enable the mitigation device to be manufactured in a smaller form factor and increase a reliability of the system by avoiding false triggers of the mitigation device during normal operation. In addition, as the gaps may be reduced in comparison to prior art systems, less ablative plasma (and therefore less energy) is required to enable the arcs to form between electrodes when an electrical fault is detected. Therefore, the mitigation device and the equipment protections system described herein may be manufactured in a cost-effective and compact manner.

Figure 1:
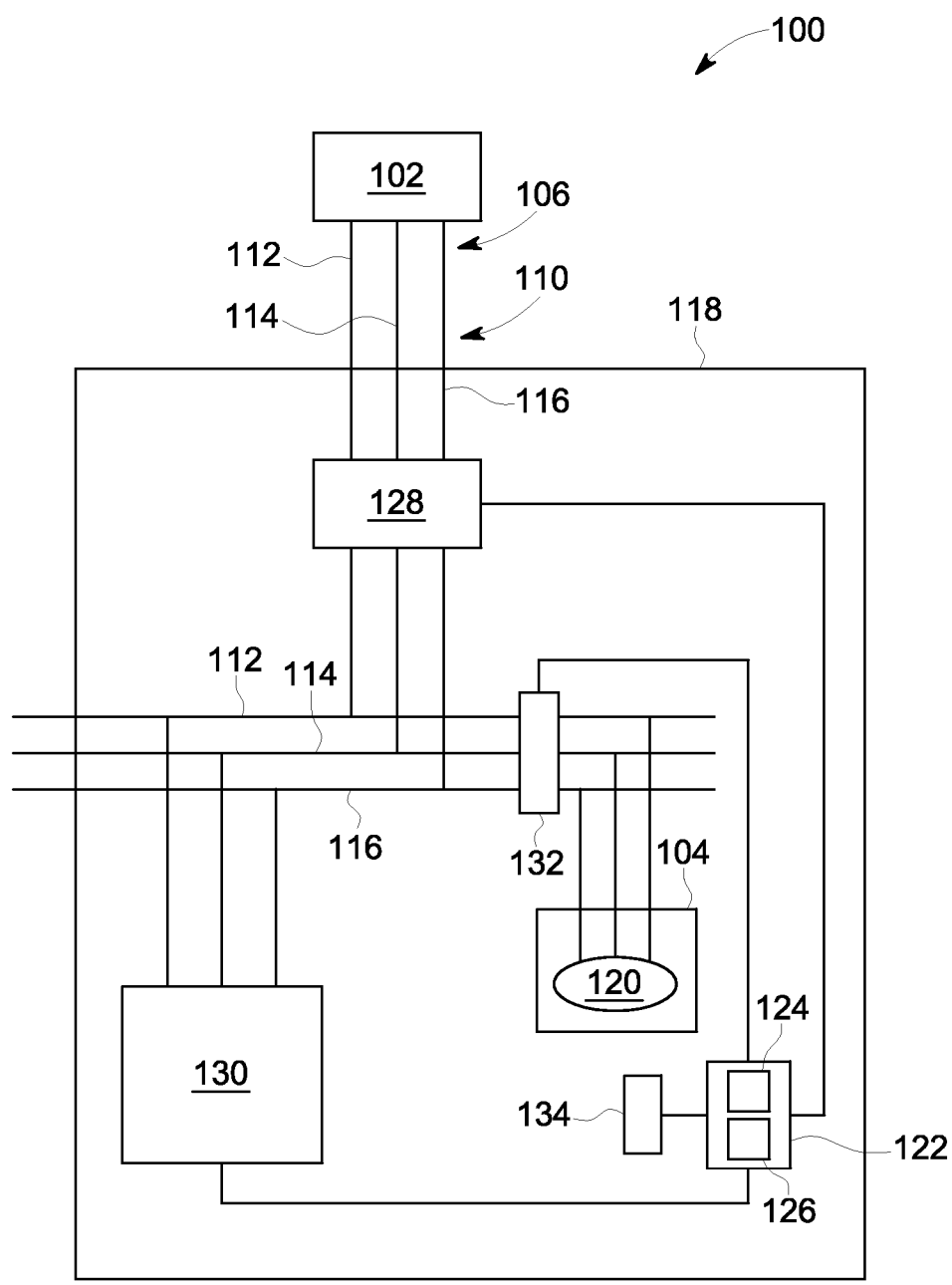
FIG. 1 is a schematic block diagram of an exemplary power distribution system.

FIG. 1 is a schematic block diagram of an exemplary power distribution system 100 that may be used to distribute electrical power (i.e., electrical current and voltage) received from an electrical power source 102 to one or more loads 104. Power distribution system 100 includes a plurality of electrical distribution lines 106 that receive current, such as three phase alternating current (AC), from electrical power source 102. Alternatively, power distribution system 100 may receive any number of phases of current through any suitable number of electrical distribution lines 106 that enables power distribution system 100 to function as described herein.

Electrical power source 102 includes, for example, an electrical power distribution network, or "grid," a steam turbine generator, a gas turbine generator, a wind turbine generator, a hydroelectric generator, a solar panel array, and/or any other device or system that generates electrical power. Loads 104 include, for example, machinery, motors, lighting, and/or other electrical and electromechanical equipment of a manufacturing, power generation, or distribution facility.

Electrical distribution lines 106 are arranged as a plurality of conductors 110. In an exemplary embodiment, conductors 110 include a first phase conductor 112, a second phase conductor 114, and a third phase conductor 116. First phase conductor 112, second phase conductor 114, and third phase conductor 116 are coupled to an equipment protection system 118 for transmitting a first phase of current, a second phase of current, and a third phase of current, respectively, to equipment protection system 118.

In an exemplary embodiment, equipment protection system 118 is a switchgear unit that protects power distribution system 100 and/or loads 104 from an electrical fault that may occur within power distribution system 100. More specifically, equipment protection system 118 electrically disconnects loads 104 from electrical distribution lines 106 (and from electrical power source 102) to interrupt current if an arc flash event 120 is detected. Alternatively, equipment protection system 118 is any other protection system that enables power distribution system 100 to selectively prevent electrical current from flowing to loads 104.

As used herein, an "arc flash event" refers to a rapid release of energy due to a fault between two electrical conductors. The rapid release of energy may cause acoustic waves and light to be generated proximate the fault, for example, within equipment protection system 118 and/or power distribution system 100.

In an exemplary embodiment, equipment protection system 118 includes a controller 122 that includes a processor 124 and a memory 126 coupled to processor 124. Processor 124 controls and/or monitors operation of equipment protection system 118. Alternatively, equipment protection system 118 includes any other suitable circuit or device for controlling and/or monitoring operation of equipment protection system 118.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Equipment protection system 118 includes a circuit interruption device 128 coupled to first phase conductor 112, second phase conductor 114, and third phase conductor 116. Circuit interruption device 128 is controlled or activated by controller 122 to interrupt current flowing through first phase conductor 112, second phase conductor 114, and third phase conductor 116. In an exemplary embodiment, circuit interruption device 128 includes a circuit breaker, contactor, switch, and/or any other device that enables current to be controllably interrupted by controller 122.

An arc mitigation system 130, or electrical fault mitigation system 130, is coupled to circuit interruption device 128 by first phase conductor 112, second phase conductor 114, and third phase conductor 116. In addition, controller 122 is communicatively coupled to arc mitigation system 130.

In an exemplary embodiment, equipment protection system 118 also includes at least one first, or current, sensor 132 and at least one second, or optical, sensor 134. Current sensor 132 is coupled to, or positioned about, first phase conductor 112, second phase conductor 114, and third phase conductor 116 for measuring and/or detecting the current flowing through conductors 112, 114, and 116. Alternatively, a separate current sensor 132 is coupled to, or positioned about, each of first phase conductor 112, second phase conductor 114, and third phase conductor 116 for measuring and/or detecting the current flowing therethrough. In an exemplary embodiment, current sensor 132 is a current transformer, a Rogowski coil, a Hall-effect sensor, and/or a shunt. Alternatively, current sensor 132 may include any other sensor that enables equipment protection system 118 to function as described herein. In an exemplary embodiment, each current sensor 132 generates one or more signals representative of the measured or detected current (hereinafter referred to as "current signals") flowing through first phase conductor 112, second phase conductor 114, and/or third phase conductor 116, and transmits the current signals to controller 122.

Optical sensor 134, in an exemplary embodiment, measures and/or detects an amount of light generated within equipment protection system 118, such as an amount of light generated by arc flash event 120. Optical sensor 134 generates one or more signals representative of the measured or detected light (hereinafter referred to as "optical signals") and transmits the optical signals to controller 122.

Controller 122 analyzes the current signals and the optical signals to determine and/or detect whether arc flash event 120 has occurred. More specifically, controller 122 compares the optical signals and/or current signals to one or more rules or thresholds to determine whether the optical signals and/or current signals contain indicators of arc flash event 120. If controller 122 determines that arc flash event 120 has occurred based on the optical signals and/or the current signals, controller 122 transmits a trip signal to circuit interruption device 128, and transmits an activation signal to arc mitigation system 130. Circuit interruption device 128 interrupts current flowing through first phase conductor 112, second phase conductor 114, and third phase conductor 116 in response to the trip signal. Arc mitigation system 130 diverts and/or discharges energy from arc flash event 120 into arc mitigation system 130, as is described more fully herein.

Figure 2:
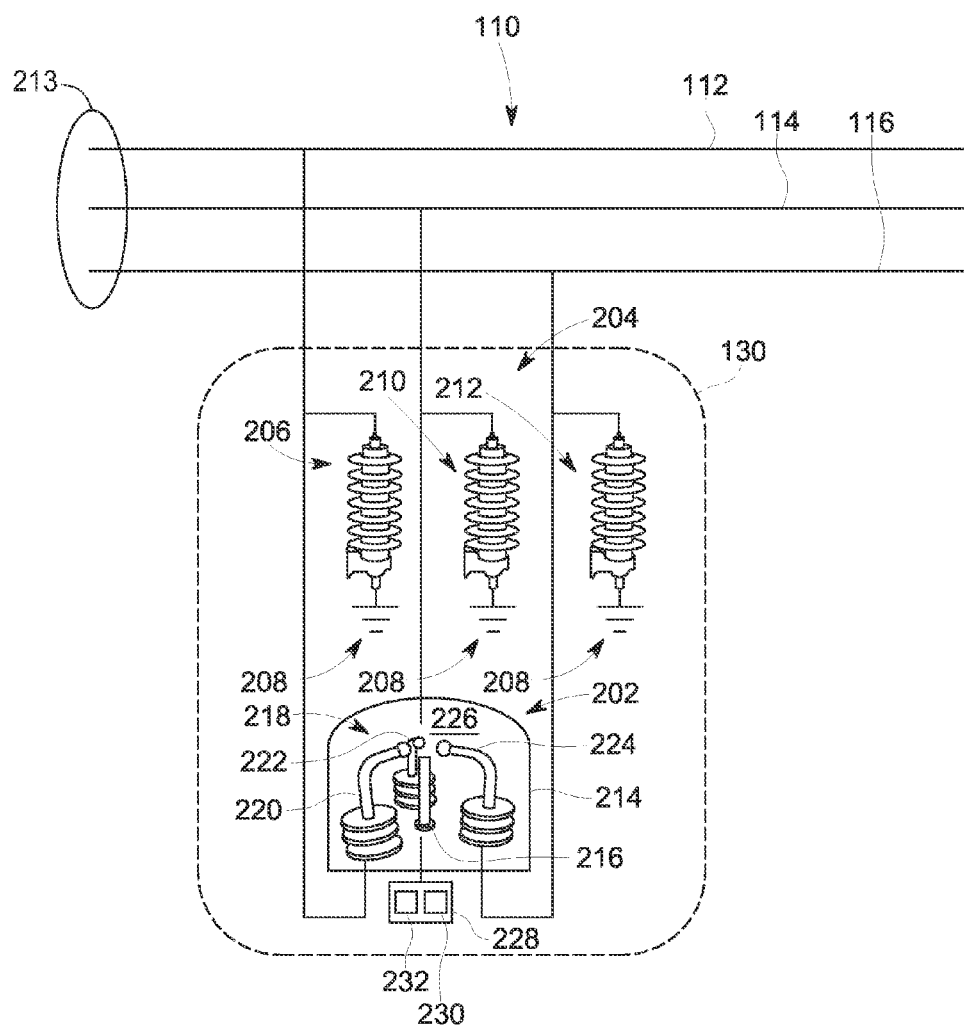
FIG. 2 is a schematic diagram of an exemplary arc mitigation system that may be used with the power distribution system shown in FIG. 1.
Figure 3:
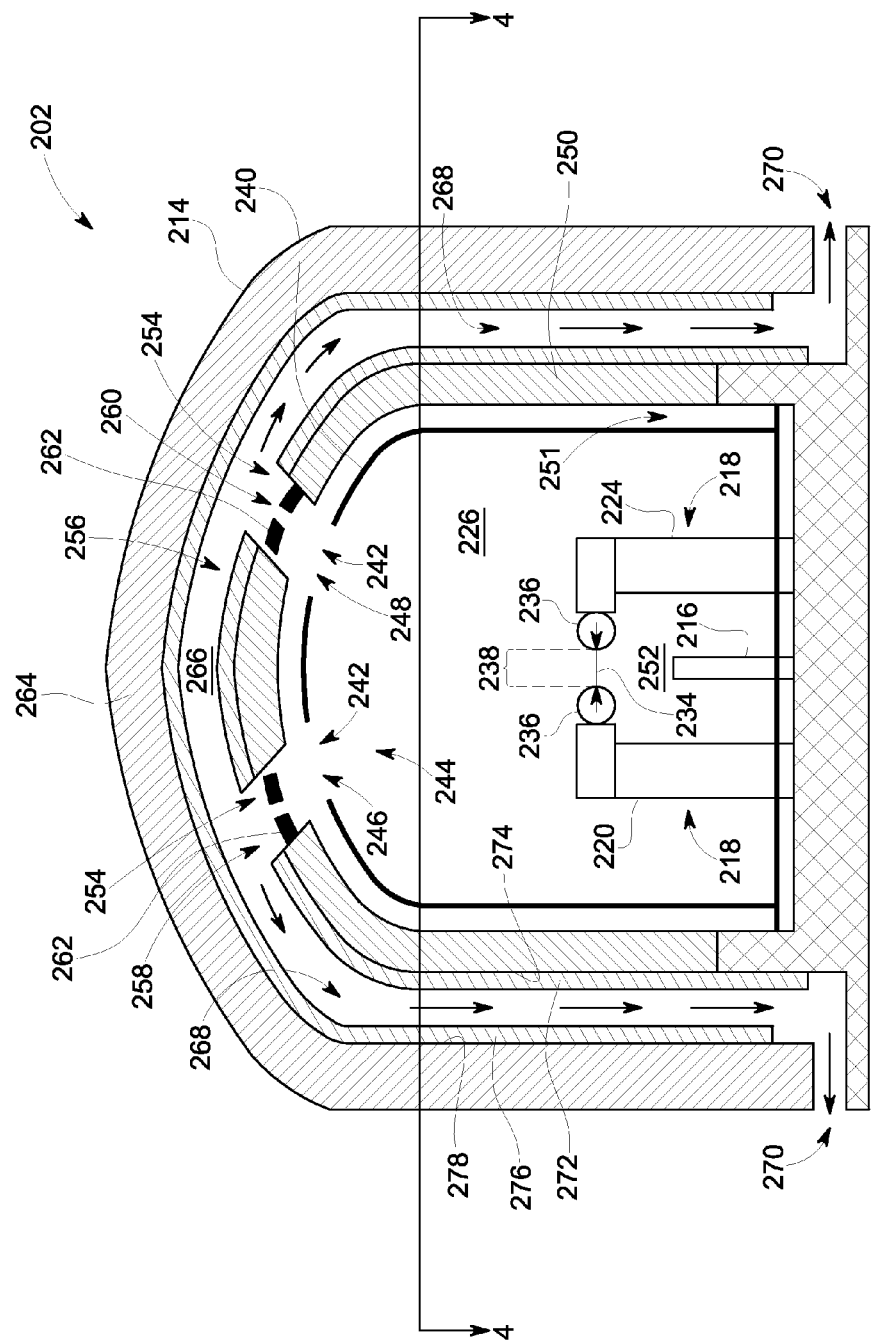
FIG. 3 is a cross-sectional view of an exemplary mitigation device that may be used with the power distribution system shown in FIG. 2.
Figure 4:
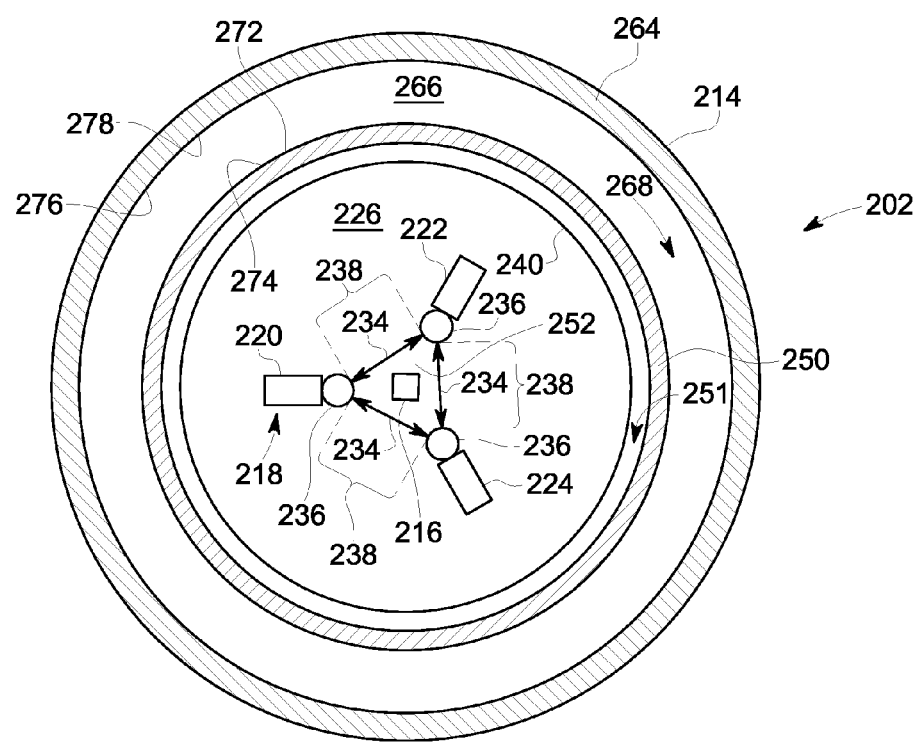
FIG. 4 is a plan view of the mitigation device shown in FIG. 3.

FIG. 2 is a schematic diagram of an exemplary arc mitigation system 130 that may be used with power distribution system 100 (shown in FIG. 1). In an exemplary embodiment, arc mitigation system 130 includes a mitigation device 202 and a plurality of voltage limiter devices 204 coupled to conductors 110. FIG. 3 is a cross-sectional view of mitigation device 202. FIG. 4 is a plan view of mitigation device 202 taken along line 4-4.

More specifically, in an exemplary embodiment, voltage limiter devices 204 include at least one first voltage limiter device 206 coupled to first phase conductor 112 and to ground 208, at least one second voltage limiter device 210 coupled to second phase conductor 114 and to ground 208, and at least one third voltage limiter device 212 coupled to third phase conductor 116 and to ground 208. Each voltage limiter device 204, in an exemplary embodiment, is a lightning arrester including at least one metal oxide varistor (MOV) configured such that a voltage across voltage limiter device 204 (i.e., across a respective conductor 110 and ground 208) is limited to a predetermined voltage threshold of voltage limiter device 204 and/or is prevented from increasing above the predetermined voltage threshold. Alternatively, voltage limiter device 204 may include any other suitable device that limits the voltage across conductor 110 and ground 208, such as a zener diode, a voltage arrester, and/or a vacuum tube. In an exemplary embodiment, if a voltage source 213, such as a lightning strike or another voltage surge within power distribution system 100, causes the voltage across conductor 110 and ground 208 to exceed the predetermined voltage threshold of voltage limiter device 204 coupled to conductor 110, voltage limiter device 204 conducts the current to ground 208 and limits the voltage of conductor 110 to the predetermined voltage level. In a specific embodiment, the predetermined voltage threshold is equal to about 42 kilovolts (kV) such that voltage limiter devices 204 limit, or "clamp," the voltage of conductors 110 to about 42 kV if the voltage exceeds the voltage threshold.

Mitigation device 202 is communicatively coupled to controller 122 and is controlled by controller 122. Mitigation device 202 includes a containment chamber 214 that encloses a plasma gun 216 and a plurality of electrodes 218, such as a first electrode 220, a second electrode 222, and a third electrode 224. More specifically, first electrode 220, second electrode 222, third electrode 224, and plasma gun 216 are positioned within a cavity 226 defined within containment chamber 214. First electrode 220 is coupled to first phase conductor 112, second electrode 222 is coupled to second phase conductor 114, and third electrode 224 is coupled to third phase conductor 116. In an exemplary embodiment, plasma gun 216 is a star-configured longitudinal plasma gun. Alternatively, plasma gun 216 is configured in any other suitable manner that enables plasma gun 216 to function as described herein.

In an exemplary embodiment, a trigger circuit 228 is coupled to mitigation device 202, and more specifically, to plasma gun 216, to activate plasma gun 216. More specifically, trigger circuit 228 receives the activation signal from controller 122 and energizes plasma gun with a voltage signal and/or a current signal. In an exemplary embodiment, trigger circuit 228 is a dual-source circuit that includes a voltage source 230 and a current source 232. In response to the activation signal, voltage source 230 applies a voltage across the electrodes (not shown) of plasma gun 216 such that an electrical breakdown of air disposed between the plasma gun electrodes occurs. In response to the activation signal, current source 232 facilitates producing a flow of high magnitude current, or a high magnitude current pulse, (e.g., between about 1 kiloamperes (kA) and about 10 kA, in one embodiment) having a duration of between about 10 microseconds and about 100 microseconds across the plasma gun electrodes. The high magnitude current flow within plasma gun 216 causes high-density ablative plasma to be generated within plasma gun 216. Plasma gun 216 is designed to direct the generated ablative plasma between electrodes 218. Trigger circuit 228 may be positioned within containment chamber 214 (e.g., within cavity 226) or may be positioned proximate to chamber 214.

As shown in FIGS. 3 and 4, each electrode 218 is positioned within cavity 226 such that a gap 234 is defined between an end 236 of each electrode 218 and an end 236 of an adjacent electrode 218. Accordingly, each end 236 is spaced a distance 238 from each adjacent end 236. In an exemplary embodiment, each distance 238 is equal to each other distance 238 such that ends 236 are spaced substantially equidistantly from each other. In a specific embodiment, each distance 238 is about 40 millimeters (mm), and arc mitigation system 130 is configured to withstand a substantially instantaneous voltage surge of about 110 kV and a sustained voltage surge of about 42 kV for a time period of about 1 minute, while preventing undesired arcs to occur during normal operation. For example, a distance 238 (or gap) of about 40 mm is normally insufficient to withstand a surge voltage of 110 kV. Therefore, a voltage limiter device 204 is coupled in parallel with each electrode 218 such that, in an event of a voltage surge (e.g., from voltage source 213), voltage limiter device 204 will limit the voltage to a level that enables electrodes 218 to be spaced apart by distance 238 without an undesired arc forming across distance 238 in the absence of an arc flash event. Accordingly, in such an embodiment, arc mitigation system 130 and mitigation device 202 are suitable for use with medium voltage switchgear and/or medium voltage power distribution systems, such as switchgear and/or power distribution systems rated to operate at voltages between about 1 kV and about 35 kV, such as at about 17.5 kV. Alternatively, distance 238 may be any other distance that enables an arc to form between ends 236 when an arc flash event 120 (shown in FIG. 1) occurs within power distribution system 100 and/or equipment protection system 118 (both shown in FIG. 1).

In an exemplary embodiment, containment chamber 214 includes an inner shell 240 that substantially encloses and defines cavity 226. In one embodiment, inner shell 240 is manufactured from a shock absorbent material to enable inner shell 240 to at least partially absorb and/or contain pressure waves that may be induced within cavity 226 during operation of mitigation device 202. In an exemplary embodiment, inner shell 240 includes one or more vents 242 defined in an upper portion 244 of shell 240 to facilitate venting gases from cavity 226. While FIG. 3 illustrates two vents 242, i.e., a first vent 246 and a second vent 248, it should be recognized that inner shell 240 may include any suitable number of vents 242 that enables mitigation device 202 to function as described herein.

An inner housing 250 of containment chamber 214 substantially encloses inner shell 240. In one embodiment, a gap 251 is defined between inner shell 240 and inner housing 250. Alternatively, inner shell 240 may be maintained substantially in contact with inner housing 250 such that no gap 251 is formed therebetween. An insulative material 252, such as air 252 and/or other gases, is disposed within cavity 226. More specifically, air 252 is disposed within gaps 234 between electrodes 218 to insulate electrodes 218 from each other to prevent undesired arcing between electrodes 218 when mitigation device 202 and/or plasma gun 216 is not activated. Accordingly, air 252 within gaps 234 cause gaps 234 to have an effective impedance that resists current flow therethrough.

Inner housing 250 includes one or more vents 254 defined in an upper portion 256 of housing 250 to facilitate venting gases from cavity 226. While FIG. 3 illustrates two vents 254, i.e., a third vent 258 and a fourth vent 260, it should be recognized that inner housing 250 may include any suitable number of vents 254 that enables mitigation device 202 to function as described herein. In an exemplary embodiment, each vent 254 of inner housing 250 is in flow communication with a vent 242 of inner shell 240. Accordingly, third vent 258 is in flow communication with first vent 246 and fourth vent 260 is in flow communication with second vent 248. In addition, at least one de-ionization plate 262 is positioned within each vent 254 of inner housing 250. De-ionization plates 262 facilitate removing ions from gases exiting cavity 226 through vents 254.

An outer housing 264 is positioned about inner housing 250 to substantially enclose inner housing 250. In addition, outer housing 264 is spaced about inner housing 250 such that a channel 266 is defined between outer housing 264 and inner housing 250. Channel 266 is in flow communication with vents 242 of inner shell 240 and vents 254 of inner housing 250 to facilitate venting gases from cavity 226. Accordingly, gases 268, such as heated gases, flow through vents 242 and 254 into channel 266, and are discharged from channel 266 and containment chamber 214 through a plurality of discharge ports 270.

In an exemplary embodiment, a first ablative layer 272 is coupled to an outer surface 274 of inner housing 250 within channel 266, and a second ablative layer 276 is coupled to an inner surface 278 of outer housing 264 within channel 266 such that first ablative layer 272 and second ablative layer 276 are positioned on opposing sides of channel 266. First ablative layer 272 and second ablative layer 276 are manufactured from a suitable material, such as an ablative polymer, that cools the hot discharge gases through ablation and further facilitates deionization of the discharge gases.

During operation, if an arc flash event 120 occurs, controller 122 (shown in FIG. 1) transmits an activation signal to plasma gun 216, and plasma gun 216 emits ablative plasma into gaps 234 between electrodes 218. The ablative plasma "breaks down," or reduces the effective impedance of, the insulative material between electrodes 218 (e.g., air 252), and causes a low impedance path for current to travel between electrodes 218. The low impedance path has a lower effective impedance than an effective impedance associated with arc flash event 120. Plasma gun 216 therefore causes the first phase of current to be electrically coupled to the second phase of current, the second phase of current to be electrically coupled to the third phase of current, and/or the third phase of current to be electrically coupled to the first phase of current. Accordingly, current is directed away from arc flash event 120 to electrodes 218 such that an arc is formed between electrodes 218. The energy of arc flash event 120 is discharged, therefore, within containment chamber 214, thus mitigating the otherwise undesired consequences of arc flash event 120.

The arc or arcs generated within containment chamber 214 (i.e., within cavity 226) may cause air 252 or other gases within cavity 226 to be heated. The heated gases are discharged through vents 242 of inner shell 240 and vents 254 of inner housing 250. The gases flow through channel 266 and are discharged from containment chamber 214 through discharge ports 270. Accordingly, the large amount of energy that may be present during an arc flash event 120 may be discharged within containment chamber 214 rather than being discharged in an unrestrained manner at the site of arc flash event 120. The safety of equipment protection system 118 and/or power distribution system 100 is facilitated to be increased, and damage to components of equipment protection system 118 and/or power distribution system 100 from arc flash event 120 is facilitated to be reduced.

Figure 5:
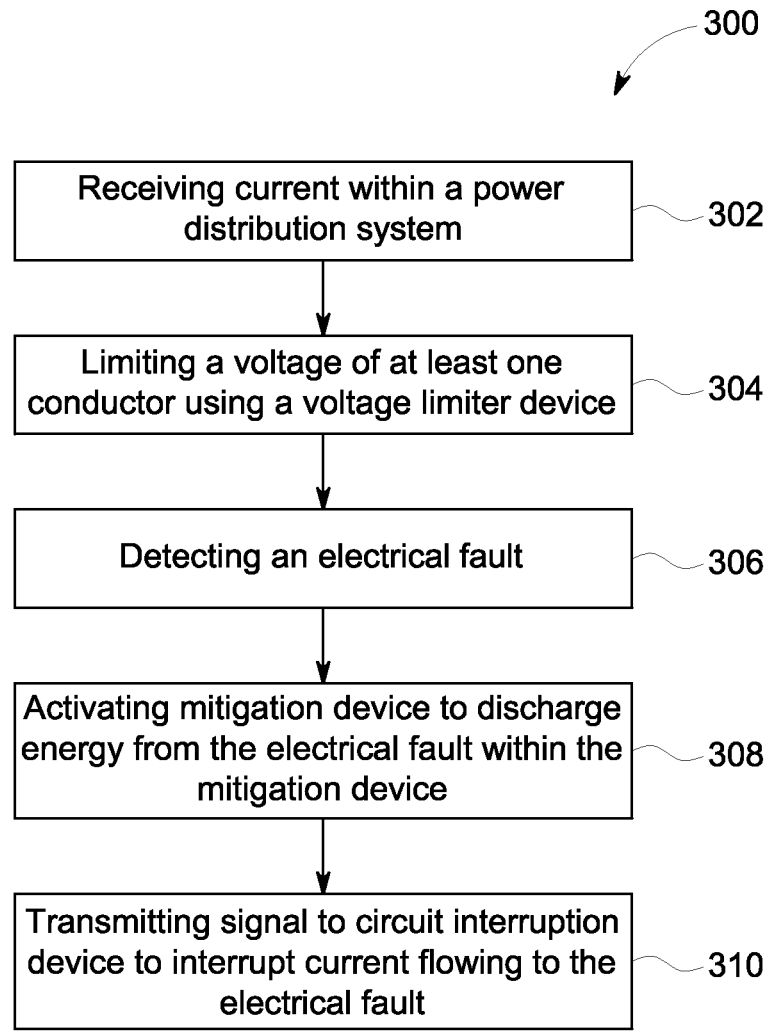
FIG. 5 is a flow diagram of an exemplary method of discharging energy from an electrical fault that may be used with the power distribution system shown in FIG. 1.

FIG. 5 is a flowchart of an exemplary method 300 of discharging energy from an electrical fault, such as an arc flash event 120 that may be used with power distribution system 100 and/or equipment protection system 118 (shown in FIG. 1).

In an exemplary embodiment, current is received 302 within power distribution system 100 from electrical power source 102 through electrical distribution lines 106 (shown in FIG. 1). The current is transmitted through equipment protection system 118 by a plurality of conductors 110 (shown in FIG. 1). A voltage of one or more conductors 110 is limited 304 using one or more voltage limiter devices 204 to prevent the voltage from increasing above a predetermined voltage threshold, for example, in an event of a voltage surge. For example, voltage limiter devices 204 prevent the voltage of conductors 110 from exceeding the predetermined voltage threshold and generating undesired electrical arcs across electrodes 218 of mitigation device 202 if a lightning strike or a voltage surge from a voltage source 213 occurs.

If an electrical fault, such as arc flash event 120, occurs within power distribution system 100 and/or within equipment protection system 118, the fault is detected 306. For example, the fault is detected 306 by controller 122 based on signals received from current sensor 132 and/or optical sensor 134 (shown in FIG. 1).

Controller 122 transmits an activation signal to mitigation device 202 to activate 308 mitigation device 202. In response to the activation signal, trigger circuit 228 causes voltage source 230 to apply a voltage across plasma gun electrodes to initiate the breakdown of air between the plasma gun electrodes. Trigger circuit 228 also causes current source 232 to apply high magnitude current between the plasma gun electrodes to create and emit the ablative plasma within containment chamber 214 to cause energy, such as current from an electrical arc, to flow between electrodes 218 of mitigation device 202. Accordingly, energy is diverted from the electrical fault and is discharged within mitigation device 202 (e.g., within containment chamber 214).

Controller 122 also transmits 310 a trip signal to circuit interruption device 128 to interrupt current flowing to the electrical fault. Accordingly, the electrical fault is facilitated to be extinguished while reducing or minimizing damage caused to components of power distribution system 100 as compared to prior art systems.

A technical effect of the method and systems described herein may include one or more of: (a) detecting an electrical fault within a power distribution system; (b) generating an activation signal in response to a detected electrical fault; and (c) activating a mitigation device using an activation signal to discharge energy from an electrical fault, wherein the mitigation device includes a first electrode coupled to a first conductor, a second electrode coupled to a second conductor, a first voltage source that generates a voltage in response to the activation signal, and a plasma gun that emits ablative plasma in response to the generated voltage to create an electrical arc between the first electrode and the second electrode to discharge the energy from the electrical fault; and (d) limiting a voltage of at least one of a first conductor and a second conductor from increasing above a predetermined threshold using at least one voltage limiter device to prevent a second voltage source from generating a second electrical arc between a first electrode and a second electrode.

Exemplary embodiments of a method and systems for discharging energy from an electrical fault are described above in detail. The method and systems are not limited to the specific embodiments described herein but, rather, operations of the method and/or components of the systems may be utilized independently and separately from other operations and/or components described herein. Further, the described operations and/or components may also be defined in, or used in combination with, other systems, methods, and/or devices, and are not limited to practice with only the systems and method as described herein.

Although the present invention is described in connection with an exemplary power distribution system, embodiments of the invention are operational with numerous other power systems, or other systems or devices. The power distribution system described herein is not intended to suggest any limitation as to the scope of use or functionality of any aspect of the invention. In addition, the power distribution system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical fault mitigation system comprising:
a mitigation device comprising:
    a containment chamber defining a cavity;
    a first electrode positioned within the cavity and coupled to a first conductor;
    a second electrode positioned within the cavity and coupled to a second conductor;
    a first voltage source; and
    a plasma gun positioned within the cavity and configured to emit ablative plasma using said first voltage source to enable a first electrical arc to form between said first electrode and said second electrode to discharge energy from an electrical fault; and
a first voltage limiter device coupled to the first conductor, wherein said first voltage limiter device is configured to limit a voltage of the first conductor from increasing above a predetermined threshold to prevent a second voltage source from generating a second electrical arc between said first electrode and said second electrode when the second voltage source applies a voltage across said first electrode and said second electrode.

2. An electrical fault mitigation system in accordance with claim 1, wherein said first electrode is separated from said second electrode by a gap and an insulative material is disposed within the gap such that the gap has an effective impedance, said plasma gun is configured to emit ablative plasma into the gap to reduce the effective impedance of the gap to a level lower than an effective impedance associated with the electrical fault.

3. An electrical fault mitigation system in accordance with claim 1, wherein the first conductor is configured to receive a first phase of current and the second conductor is configured to receive a second phase of current, wherein said plasma gun is configured to cause the first phase of current to be electrically coupled to the second phase of current.

4. An electrical fault mitigation system in accordance with claim 1, further comprising a second voltage limiter device coupled to the second conductor, wherein said second voltage limiter device is configured to limit a voltage of the second conductor.

5. An electrical fault mitigation system in accordance with claim 4, wherein at least one of said first voltage limiter device and said second voltage limiter device comprises a metal oxide varistor.

6. An electrical fault mitigation system in accordance with claim 1, further comprising a trigger circuit configured to activate said plasma gun, said trigger circuit comprising said first voltage source and a current source.

7. An electrical fault mitigation system in accordance with claim 1, wherein said containment chamber comprises an inner housing enclosing the cavity, wherein at least one vent is defined within said inner housing for venting gases from the cavity.

8. An electrical fault mitigation system in accordance with claim 7, wherein at least one de-ionization plate is positioned within the at least one vent, said de-ionization plate configured to remove ions from gases vented from the cavity.

9. An electrical fault mitigation system in accordance with claim 7, wherein said containment chamber comprises an outer housing enclosing said inner housing, said outer housing and said inner housing defining a channel for channeling the gases vented from the cavity out of said containment chamber.

10. An equipment protection system comprising:
a first conductor;
a second conductor;
a mitigation device comprising:
- a containment chamber defining a cavity;
- a first electrode positioned within the cavity and coupled to said first conductor;
- a second electrode positioned within the cavity and coupled to said second conductor;
- a first voltage source; and
- a plasma gun positioned within the cavity; and a controller communicatively coupled to said mitigation device, said controller configured to detect an electrical fault and to generate an activation signal in response to the detected electrical fault, wherein the activation signal causes said first voltage source to apply a voltage to said plasma gun, wherein said plasma gun emits ablative plasma in response to the applied voltage to enable an electrical arc to form between said first electrode and said second electrode to discharge energy from the electrical fault; and a first voltage limiter device coupled to said first conductor, wherein said first voltage limiter device is configured to limit a voltage of said first conductor from increasing above a predetermined threshold to prevent a second voltage source from generating a second electrical arc between said first electrode and said second electrode.

11. An equipment protection system in accordance with claim 10, wherein said first electrode is separated from said second electrode by a gap and an insulative material is disposed within the gap such that the gap has an effective impedance, said plasma gun is configured to emit ablative plasma into the gap to reduce the effective impedance of the gap to a level lower than an effective impedance associated with the electrical fault.

12. An equipment protection system in accordance with claim 10, wherein said first conductor is configured to receive a first phase of current and said second conductor is configured to receive a second phase of current, wherein said plasma gun is configured to cause the first phase of current to be electrically coupled to the second phase of current.

13. An equipment protection system in accordance with claim 10, further comprising a second voltage limiter device coupled to said second conductor, wherein said second voltage limiter device is configured to limit a voltage of said second conductor.

14. An equipment protection system in accordance with claim 13, wherein at least one of said first voltage limiter device and said second voltage limiter device comprises a metal oxide varistor.

15. An equipment protection system in accordance with claim 10, further comprising a trigger circuit configured to activate said plasma gun, said trigger circuit comprising said first voltage source and a current source.

16. An equipment protection system in accordance with claim 10, wherein said containment chamber comprises an inner housing enclosing the cavity, wherein at least one vent is defined within the inner housing for venting gases from the cavity.

17. An equipment protection system in accordance with claim 16, wherein at least one de-ionization plate is positioned within the at least one vent, said de-ionization plate configured to remove ions from gases vented from the cavity.

18. An equipment protection system in accordance with claim 16, wherein said containment chamber comprises an outer housing enclosing said inner housing, said outer housing and said inner housing defining a channel for channeling the gases vented from the cavity out of said containment chamber.

19. A method of discharging energy from an electrical fault within a power distribution system including a first conductor and a second conductor;
- detecting an electrical fault within the power distribution system;
- generating an activation signal in response to the detected electrical fault;
- activating a mitigation device using the activation signal to discharge energy from the electrical fault, wherein the mitigation device includes a first electrode coupled to the first conductor, a second electrode coupled to the second conductor, a first voltage source that generates a voltage in response to the activation signal, and a plasma gun that emits ablative plasma in response to the generated voltage to create an electrical arc between the first electrode and the second electrode to discharge the energy from the electrical fault; and
- limiting a voltage of at least one of the first conductor and the second conductor from increasing above a predetermined threshold using at least one voltage limiter device to prevent a second voltage source from generating a second electrical arc between the first electrode and the second electrode.

20. A method in accordance with claim 19, further comprising transmitting a trip signal to a circuit interruption device in response to the detected electrical fault, wherein the trip signal causes the circuit interruption device to interrupt an electrical current flowing to the electrical fault.

* * * * *